United States Patent
Long et al.

(10) Patent No.: US 9,605,615 B2
(45) Date of Patent: Mar. 28, 2017

(54) MODEL PREDICTIVE CONTROL SYSTEMS AND METHODS FOR INCREASING COMPUTATIONAL EFFICIENCY

(71) Applicant: GM Global Technology Operations LLC, Detroit, MI (US)

(72) Inventors: Ruixing Long, Windsor (CA); Ning Jin, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 14/675,860

(22) Filed: Apr. 1, 2015

(65) Prior Publication Data
US 2016/0237932 A1    Aug. 18, 2016

Related U.S. Application Data

(60) Provisional application No. 62/115,293, filed on Feb. 12, 2015.

(51) Int. Cl.
     *F02D 41/04*      (2006.01)
     *F02D 41/00*      (2006.01)
     (Continued)

(52) U.S. Cl.
     CPC ....... *F02D 41/045* (2013.01); *F02D 41/0007* (2013.01); *F02D 41/0077* (2013.01);
     (Continued)

(58) Field of Classification Search
     CPC ............. F02D 2250/18; F02D 2250/21; F02D 2250/26; F02D 2250/22; F02D 11/105;
     (Continued)

(56) References Cited

U.S. PATENT DOCUMENTS

| 4,161,929 A | | 7/1979 | Nohira et al. |
| 4,653,449 A | * | 3/1987 | Kamei ................ F02D 41/1401 123/478 |

(Continued)

FOREIGN PATENT DOCUMENTS

| CN | 1594846 A | 3/2005 |
| WO | WO-03-065135 A1 | 8/2003 |

OTHER PUBLICATIONS

U.S. Appl. No. 15/181,559, filed Jun. 14, 2016, Shifang Li et al.

(Continued)

*Primary Examiner* — Sizo Vilakazi

(57) ABSTRACT

A model predictive control (MPC) module performs multiple iterations to determine a current set of target values for an engine based on a torque request, a model of the engine, a tableau matrix, and a basic solution matrix. Each of the iterations includes: determining whether the basic solution matrix is not in standard form; when the basic solution matrix is not in standard form, identifying a first column of the tableau matrix based on a first entry position of the primal variable of the non-basic pair; when the basic solution matrix is in standard form and one or more primal variables of the basic solution matrix are negative, identifying the first column of the tableau matrix based on a second entry position of a dual variable of the basic pair; and selectively updating the basic solution matrix based on the first column of the tableau matrix.

20 Claims, 5 Drawing Sheets

(51) Int. Cl.
  *F02D 41/26* (2006.01)
  *F02D 41/14* (2006.01)
(52) U.S. Cl.
  CPC ......... *F02D 41/1406* (2013.01); *F02D 41/26* (2013.01); *F02D 2041/001* (2013.01); *F02D 2041/0017* (2013.01); *F02D 2041/1412* (2013.01); *F02D 2041/1433* (2013.01)
(58) Field of Classification Search
  CPC ......... F02D 41/2422; F02D 2041/1433; F02D 41/1406; F02D 41/045; F02D 41/0007; F02D 41/0077; F02D 41/26; B60W 10/06; B60W 30/1882
  See application file for complete search history.

(56) References Cited

U.S. PATENT DOCUMENTS

| | | | |
|---|---|---|---|
| 4,823,266 A | 4/1989 | Baltusis et al. |
| 5,070,846 A | 12/1991 | Dudek et al. |
| 5,101,786 A | 4/1992 | Kamio et al. |
| 5,268,835 A | 12/1993 | Miyagaki et al. |
| 5,270,935 A | 12/1993 | Dudek et al. |
| 5,293,553 A | 3/1994 | Dudek et al. |
| 5,347,446 A | 9/1994 | Iino et al. |
| 5,357,932 A | 10/1994 | Clinton et al. |
| 5,609,136 A | 3/1997 | Tuken |
| 5,706,780 A | 1/1998 | Shirakawa |
| 5,727,528 A | 3/1998 | Hori et al. |
| 5,775,293 A | 7/1998 | Kresse |
| 5,794,171 A | 8/1998 | Bryant et al. |
| 5,921,219 A | 7/1999 | Frohlich et al. |
| 6,014,955 A | 1/2000 | Hosotani et al. |
| 6,155,230 A | 12/2000 | Iwano et al. |
| 6,532,935 B2 | 3/2003 | Ganser et al. |
| 6,571,191 B1 | 5/2003 | York et al. |
| 6,606,981 B2 | 8/2003 | Itoyama |
| 6,619,261 B1 | 9/2003 | Wang et al. |
| 6,704,638 B2 | 3/2004 | Livshiz et al. |
| 6,714,852 B1 | 3/2004 | Lorenz et al. |
| 6,826,904 B2 | 12/2004 | Miura |
| 6,840,215 B1 | 1/2005 | Livshiz et al. |
| 6,928,362 B2 | 8/2005 | Meaney |
| 6,985,809 B2 | 1/2006 | Yasui |
| 7,016,779 B2 | 3/2006 | Bowyer |
| 7,021,282 B1 | 4/2006 | Livshiz et al. |
| 7,051,058 B2 | 5/2006 | Wagner et al. |
| 7,076,953 B2 | 7/2006 | Kreso |
| H2182 H | 2/2007 | Freel et al. |
| 7,225,782 B2 | 6/2007 | Pallett et al. |
| 7,274,986 B1 | 9/2007 | Petridis et al. |
| 7,275,374 B2 | 10/2007 | Stewart et al. |
| 7,328,577 B2 | 2/2008 | Stewart et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,472,692 B2 | 1/2009 | Nakagawa et al. |
| 7,614,384 B2 | 11/2009 | Livshiz et al. |
| 7,650,225 B2 | 1/2010 | Nakagawa et al. |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,783,409 B2 | 8/2010 | Kang et al. |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,967,720 B2 | 6/2011 | Martin et al. |
| 8,032,235 B2 | 10/2011 | Sayyar-Rodsari |
| 8,041,487 B2 | 10/2011 | Worthing et al. |
| 8,050,841 B2 | 11/2011 | Costin et al. |
| 8,073,610 B2 | 12/2011 | Heap et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,176,735 B2 | 5/2012 | Komatsu |
| 8,255,139 B2 | 8/2012 | Whitney et al. |
| 8,265,854 B2 | 9/2012 | Stewart et al. |
| 8,307,814 B2 | 11/2012 | Leroy et al. |
| 8,360,040 B2 | 1/2013 | Stewart et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| RE44,452 E | 8/2013 | Stewart et al. |
| 8,560,204 B2 | 10/2013 | Simon, Jr. et al. |
| 8,739,766 B2 | 6/2014 | Jentz et al. |
| 8,760,003 B2 | 6/2014 | Imura et al. |
| 8,862,248 B2 | 10/2014 | Yasui |
| 8,954,257 B2 | 2/2015 | Livshiz et al. |
| 9,052,997 B2 | 6/2015 | Ono |
| 9,062,631 B2 | 6/2015 | Kinugawa et al. |
| 9,075,406 B2 | 7/2015 | Nakada |
| 9,127,614 B2 | 9/2015 | Ueno et al. |
| 9,145,841 B2 | 9/2015 | Miyazaki et al. |
| 9,175,628 B2 | 11/2015 | Livshiz et al. |
| 9,243,524 B2 | 1/2016 | Whitney et al. |
| 9,328,671 B2 | 5/2016 | Whitney et al. |
| 9,334,815 B2 | 5/2016 | Cygan, Jr. et al. |
| 9,399,959 B2 | 7/2016 | Whitney et al. |
| 2002/0038647 A1 | 4/2002 | Tashiro et al. |
| 2002/0078924 A1 | 6/2002 | Yagi |
| 2002/0128116 A1 | 9/2002 | Idogawa et al. |
| 2002/0179050 A1 | 12/2002 | Soliman et al. |
| 2003/0074892 A1 | 4/2003 | Miura |
| 2003/0110760 A1 | 6/2003 | Shirakawa |
| 2003/0145836 A1 | 8/2003 | Linna et al. |
| 2003/0177765 A1 | 9/2003 | Wang |
| 2004/0107034 A1* | 6/2004 | Togai ............... B60K 26/04 |
| | | 701/54 |
| 2004/0116220 A1 | 6/2004 | Yamamoto et al. |
| 2005/0065691 A1 | 3/2005 | Cho |
| 2005/0131620 A1 | 6/2005 | Bowyer |
| 2005/0166900 A1 | 8/2005 | Song et al. |
| 2005/0171670 A1 | 8/2005 | Yoshioka et al. |
| 2005/0193739 A1 | 9/2005 | Brunell et al. |
| 2005/0204726 A1 | 9/2005 | Lewis |
| 2005/0228573 A1 | 10/2005 | Gangopadhyay |
| 2005/0267608 A1 | 12/2005 | Nishira et al. |
| 2006/0113799 A1 | 6/2006 | Obayashi et al. |
| 2006/0137335 A1 | 6/2006 | Stewart et al. |
| 2006/0199699 A1 | 9/2006 | Berglund et al. |
| 2007/0068159 A1 | 3/2007 | Ueno et al. |
| 2007/0174003 A1 | 7/2007 | Ueno et al. |
| 2008/0120009 A1 | 5/2008 | Livshiz et al. |
| 2008/0127938 A1 | 6/2008 | Hagari |
| 2008/0271718 A1 | 11/2008 | Schondorf et al. |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 | 2/2009 | Jung et al. |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 | 6/2009 | Yamaoka et al. |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthing et al. |
| 2010/0057329 A1 | 3/2010 | Livshiz et al. |
| 2010/0075803 A1 | 3/2010 | Sharples et al. |
| 2010/0116249 A1 | 5/2010 | Guerrassi et al. |
| 2010/0116250 A1 | 5/2010 | Simon, Jr. et al. |
| 2010/0180876 A1 | 7/2010 | Leroy et al. |
| 2010/0211294 A1 | 8/2010 | Soejima |
| 2010/0222982 A1 | 9/2010 | Wang et al. |
| 2010/0241335 A1 | 9/2010 | Aso |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0066308 A1 | 3/2011 | Yang et al. |
| 2011/0082629 A1 | 4/2011 | Soejima et al. |

(56) References Cited

U.S. PATENT DOCUMENTS

| | | |
|---|---|---|
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0125390 A1 | 5/2011 | Bellinger et al. |
| 2011/0144838 A1 | 6/2011 | Matthews et al. |
| 2011/0264353 A1 | 10/2011 | Atkinson et al. |
| 2012/0065864 A1 | 3/2012 | Whitney et al. |
| 2012/0150399 A1 | 6/2012 | Kar et al. |
| 2012/0203434 A1 | 8/2012 | Sujan et al. |
| 2012/0209493 A1 | 8/2012 | Miyata et al. |
| 2012/0296557 A1 | 11/2012 | Ramappan et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2013/0255625 A1 | 10/2013 | Kar et al. |
| 2014/0076279 A1 | 3/2014 | Livshiz et al. |
| 2014/0123938 A1 | 5/2014 | Whitney et al. |
| 2014/0174413 A1 | 6/2014 | Huang et al. |
| 2014/0174414 A1 | 6/2014 | Huang et al. |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |
| 2015/0361915 A1 | 12/2015 | Sujan et al. |
| 2015/0369146 A1 | 12/2015 | Zavala Jurado et al. |
| 2016/0131061 A1* | 5/2016 | Whitney ............... F02D 41/28 701/108 |
| 2016/0237927 A1* | 8/2016 | Long ............... F02D 41/0077 |
| 2016/0237932 A1 | 8/2016 | Long et al. |

OTHER PUBLICATIONS

Y. Tian; Department of Aerospace Engineering, the University of Michigan, Ann Arbor, United States; S. Li; Y.-Y. Wang; I. V. Kolmanovsky; "Risk prediction and its use for control of constrained systems with disturbances"; Published in 2015; American Control Conference (ACC); Chicago, IL USA; Jul. 1-3, 2015; pp. 2987-2992.

U.S. Appl. No. 13/613,588, filed Sep. 13, 2012, Livshiz et al.
U.S. Appl. No. 13/613,683, filed Sep. 13, 2012, Livshiz et al.
U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,132, filed Jun. 6, 2013, Whitney et al.
U.S. Appl. No. 13/911,148, filed Jun. 6, 2013, Whitney et al.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
U.S. Appl. No. 14/309,047, filed Jun. 19, 2014, Jose C. Zavala Jurado et al.
U.S. Appl. No. 14/675,828, filed Apr. 1, 2015, Long et al.
John C. G. Boot; "Quadratic Programming; Algorithms, Anomalies, Applications vol. 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
Kolmanovsky, I., "Towards Engine and Powertrain Control Based on Model Predictive Control," (Sep. 28, 2012), Powerpoint Presentation, 47 slides.
U.S. Appl. No. 14/931,134, filed Nov. 3, 2015, Wong et al.
U.S. Appl. No. 14/617,068, filed Feb. 9, 2015, Whitney et al.

\* cited by examiner

MODEL PREDICTIVE CONTROL SYSTEMS AND METHODS FOR INCREASING COMPUTATIONAL EFFICIENCY

CROSS-REFERENCE TO RELATED APPLICATIONS

This application claims the benefit of U.S. Provisional Application No. 62/115,293, filed on Feb. 12, 2015. The disclosure of the above application is incorporated herein by reference in its entirety.

This application is related to U.S. patent application Ser. No. 14/675,828, which is filed on Apr. 1, 2015 and claims the benefit of U.S. Provisional Application No. 62/115,208 filed on Feb. 12, 2015. The disclosure of the above application is incorporated herein by reference in its entirety.

FIELD

The present disclosure relates to internal combustion engines and more particularly to engine control systems and methods for vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

In a feature, an engine control system of a vehicle is disclosed. A torque requesting module generates a first torque request for a spark ignition engine based on driver input. A torque conversion module converts the first torque request into a second torque request. A model predictive control (MPC) module performs multiple iterations to determine a current set of target values based on the second torque request, a model of the engine, a tableau matrix, and a basic solution matrix. Each of the iterations includes the MPC module: determining whether the basic solution matrix is: not in standard form including a non-basic pair of primal and dual variables; or in standard form including a basic pair of primal and dual variables; when the basic solution matrix is not in standard form, identifying a first column of the tableau matrix based on a first entry position of the primal variable of the non-basic pair; when the basic solution matrix is in standard form and one or more primal variables of the basic solution matrix are negative, identifying the first column of the tableau matrix based on a second entry position of a dual variable of the basic pair; and selectively updating the basic solution matrix based on the first column of the tableau matrix. An actuator module controls an engine actuator based on a first one of the current set of target values.

In further features, the MPC module determines the current set of target values based on entries of the basic solution matrix when the basic solution matrix is in standard form and all primal variables of the basic solution matrix are positive.

In further features, the MPC module determines the current set of target values based on entries of the basic solution matrix when the basic solution matrix is in standard form and all primal variables of the basic solution matrix are positive.

In further features, when the basic solution matrix is in standard form and all primal variables of the basic solution matrix are positive, the MPC module: determines changes for the target values, respectively, based on entries of the basic solution matrix; and determines the current set of target values by summing the changes with a last set of target values, respectively.

In further features, when the basic solution matrix is in standard form, the MPC module identifies the first column of the tableau matrix based on a third entry position of the dual variable that is paired with a most negative primal variable.

In further features, the MPC module selectively updates the basic solution matrix based on a ratio of: one of a dual variable of the basic solution matrix and a primal variable of the basic solution matrix; to a corresponding entry of the tableau matrix.

In further features, for each dual variable and a primal variable of the basic solution matrix, the MPC module determines a ratio between that entry of the basic solution matrix and the corresponding entry of the tableau matrix, identifies a smallest positive one of the ratios, and selectively updates the basic solution matrix based on the entry position of the corresponding entry of the tableau matrix.

In further features, the MPC module indicates that a failure has occurred when none of the ratios are positive.

In further features, the MPC module does not perform matrix multiplication of entries of matrices for predetermined weighting values that are equal to zero.

In further features: a boost actuator module controls opening of a wastegate of a turbocharger based on a second one of the current set of target values; an exhaust gas recirculation (EGR) actuator module controls opening of an EGR valve based on a third one of the current set of target values; and a phaser actuator module that controls intake and exhaust valve phasing based on fourth and fifth ones of the current set of target values, respectively. The actuator module controls opening of a throttle valve based on the one of the current set of target values.

In a feature, an engine control method of a vehicle is disclosed. The engine control method includes: generating a first torque request for a spark ignition engine based on driver input; converting the first torque request into a second torque request; using a model predictive control (MPC) module that performs multiple iterations to determine a current set of target values based on the second torque request, a model of the engine, a tableau matrix, and a basic solution matrix, each iteration including: determining whether the basic solution matrix is: not in standard form including a non-basic pair of primal and dual variables; or in standard form including a basic pair of primal and dual variables; when the basic solution matrix is not in standard form, identifying a first column of the tableau matrix based on a first entry position of the primal variable of the non-basic pair; when the basic solution matrix is in standard form and one or more primal variables of the basic solution matrix are negative, identifying the first column of the tableau matrix based on a second entry position of a dual variable of the basic pair; and selectively updating the basic solution matrix based on the first column of the tableau matrix. The engine control method also includes controlling an engine actuator based on a first one of the current set of target values.

In further features, the engine control method further includes determining the current set of target values based on entries of the basic solution matrix when the basic solution matrix is in standard form and all primal variables of the basic solution matrix are positive.

In further features, the engine control method further includes determining the current set of target values based on entries of the basic solution matrix when the basic solution matrix is in standard form and all primal variables of the basic solution matrix are positive.

In further features, the engine control method further includes, when the basic solution matrix is in standard form and all primal variables of the basic solution matrix are positive: determining changes for the target values, respectively, based on entries of the basic solution matrix; and determining the current set of target values by summing the changes with a last set of target values, respectively.

In further features, the engine control method further includes, when the basic solution matrix is in standard form, identifying the first column of the tableau matrix based on a third entry position of the dual variable that is paired with a most negative primal variable.

In further features, the engine control method further includes selectively updating the basic solution matrix based on a ratio of: one of a dual variable of the basic solution matrix and a primal variable of the basic solution matrix; to a corresponding entry of the tableau matrix.

In further features, the engine control method further includes, for each dual variable and a primal variable of the basic solution matrix: determining a ratio between that entry of the basic solution matrix and the corresponding entry of the tableau matrix; identifying a smallest positive one of the ratios; and selectively updating the basic solution matrix based on the entry position of the corresponding entry of the tableau matrix.

In further features, the engine control method further includes indicating that a failure has occurred when none of the ratios are positive.

In further features, the engine control method further includes not performing matrix multiplication of entries of matrices for predetermined weighting values that are equal to zero.

In further features, the engine control method further includes: controlling opening of a wastegate of a turbocharger based on a second one of the current set of target values; controlling an exhaust gas recirculation (EGR) actuator valve based on a third one of the current set of target values; and controlling intake and exhaust valve phasing based on fourth and fifth ones of the current set of target values, respectively; and controlling opening of a throttle valve based on the one of the current set of target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, determined based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM determines optimum target values by iteratively solving a constrained quadratic optimization problem each control loop. The ECM of the present disclosure solves the optimization problem in a computationally efficient manner.

Figure 1:
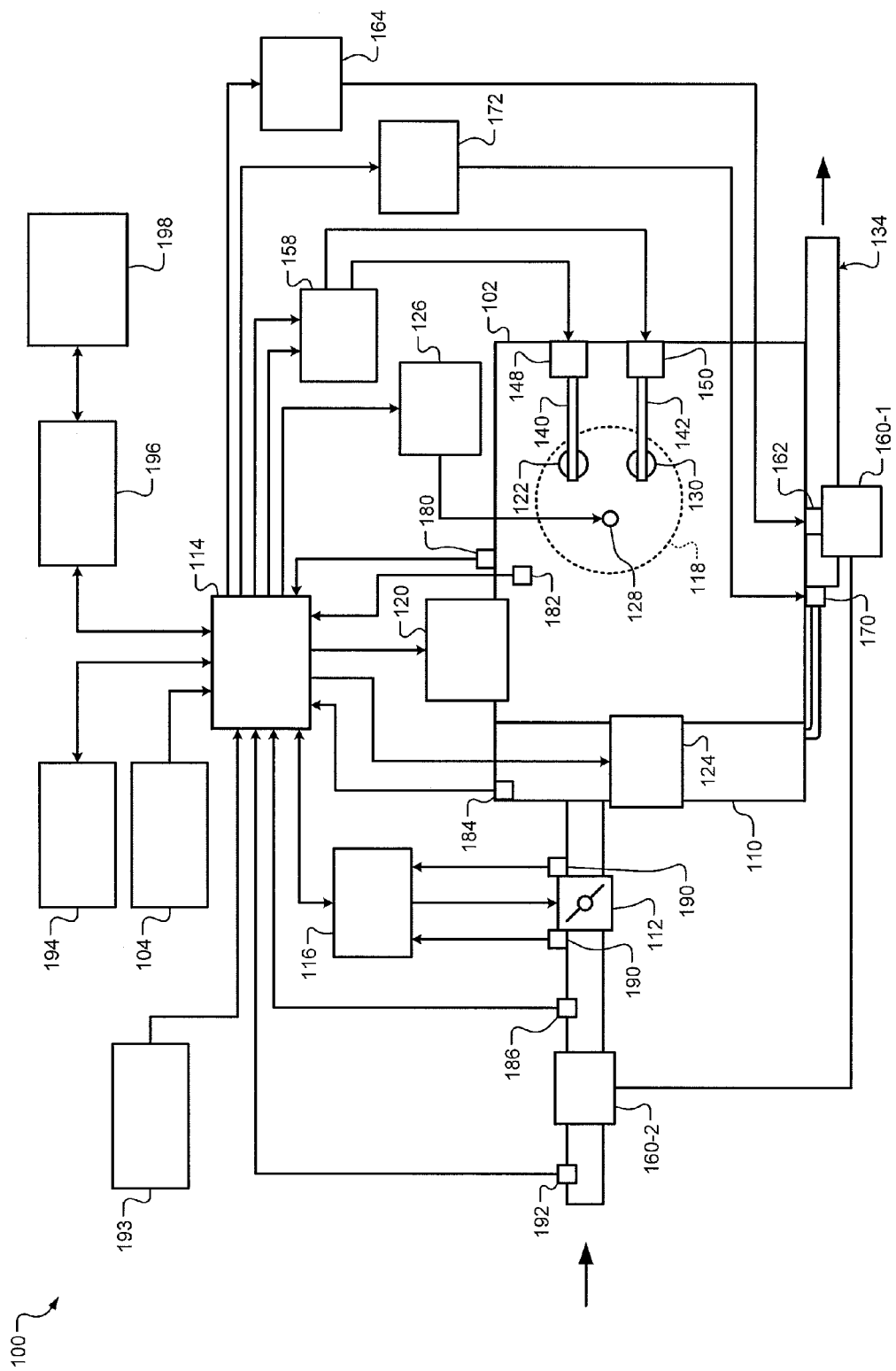
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
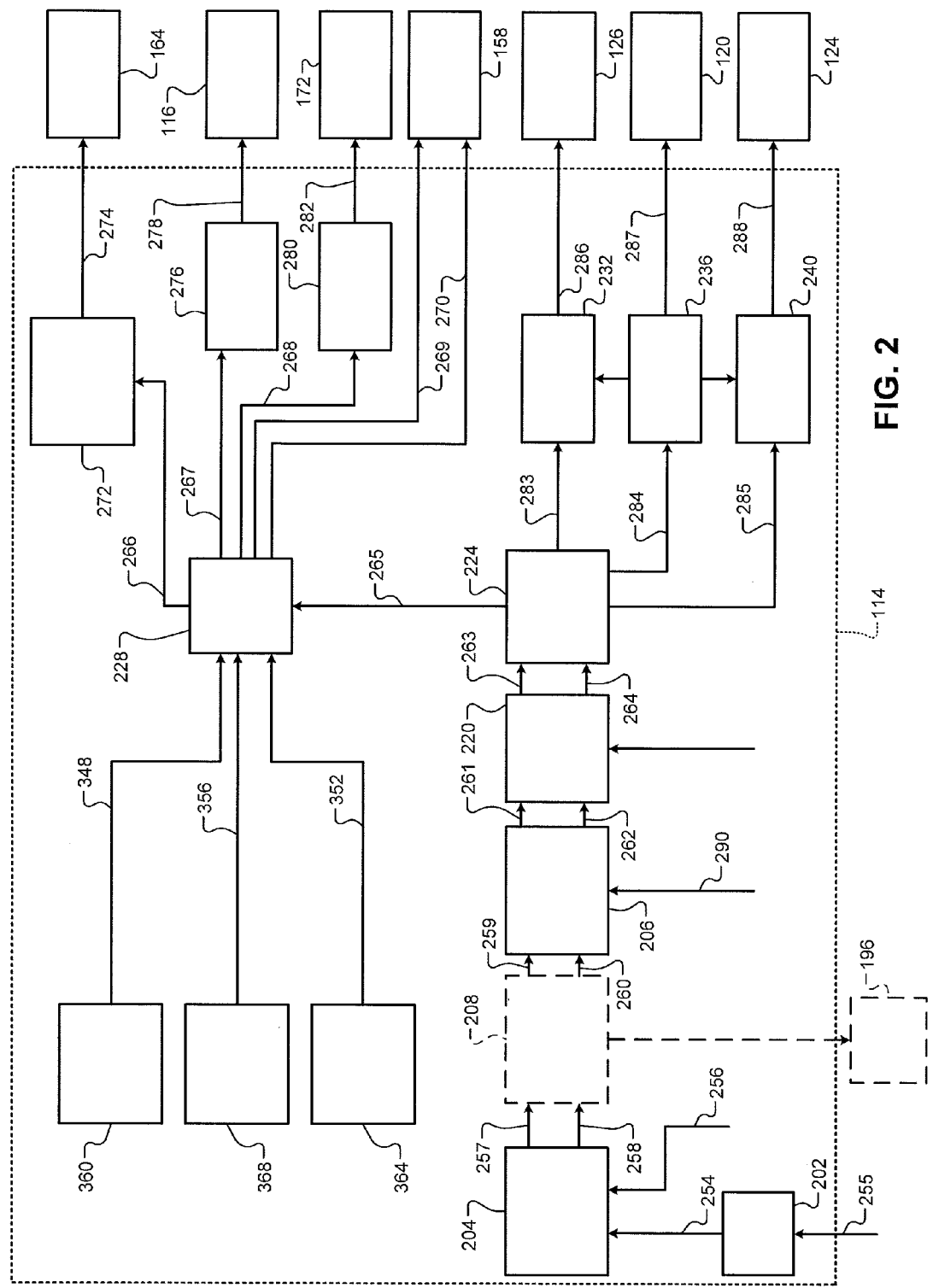
FIG. 2 is a functional block diagram of an example engine control system.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206.

In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#),$$

where APC is an APC, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a minimum spark advance for best torque (MBT spark timing) as possible. Best torque refers to the maximum engine output torque that is generated for a given air flow as spark timing is advanced, while using fuel having an octane rating greater than a predetermined octane rating and using stoichiometric fueling. The spark timing at which this best occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
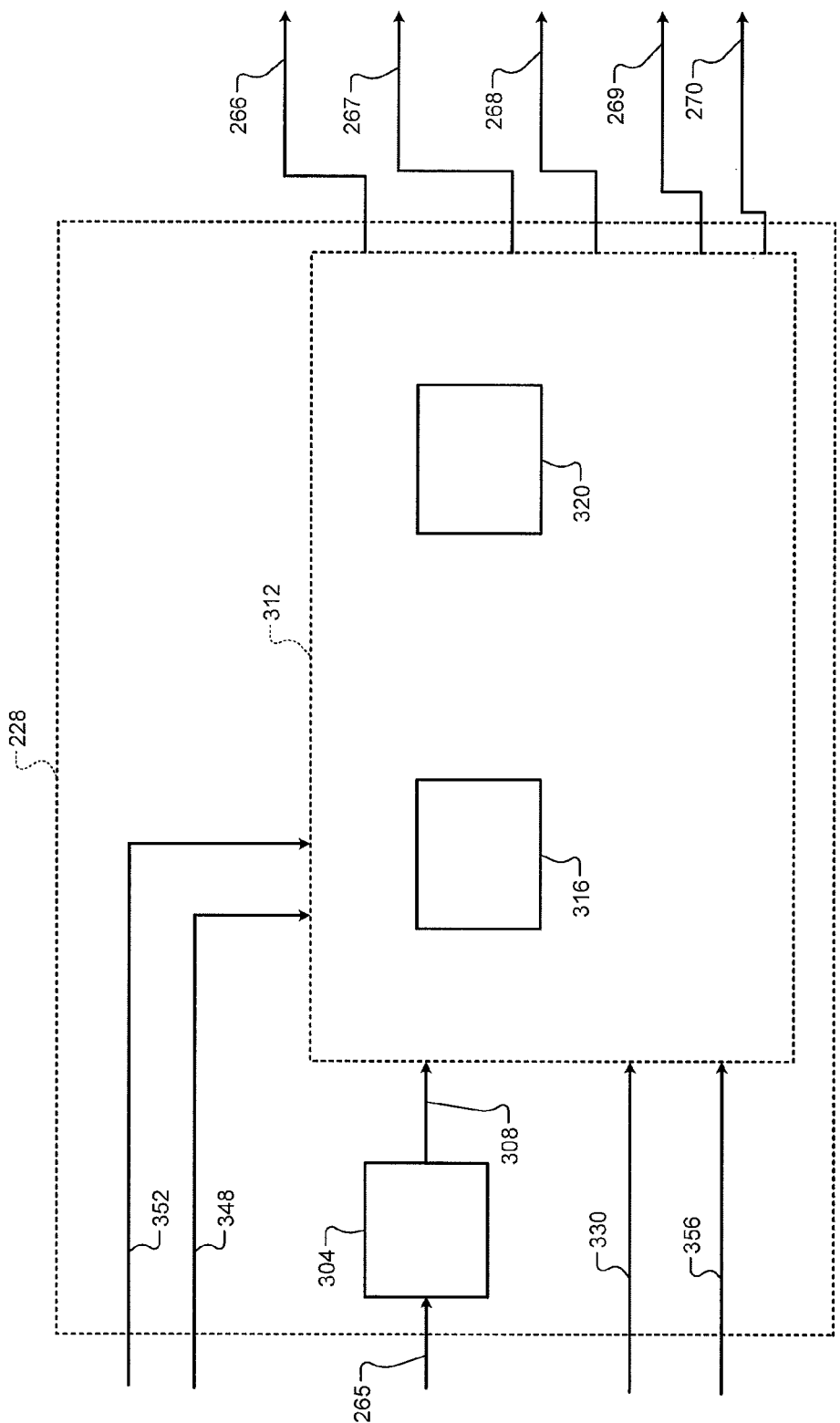
FIG. 3 is a functional block diagram of an example air control module.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque will be referred to as a base air torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 308, for example, using a mapping or a function that relates brake torques to base torques. In various implementations, the torque conversion module 304 may convert the air torque request 265 into another suitable type of torque, such as an indicated torque. An indicated torque may refer to a torque at the crankshaft attributable to work produced via combustion within the cylinders.

An MPC module 312 generates the target values 266-270 to achieve the base air torque request 308 using MPC (Model Predictive Control). The MPC module 312 includes a state estimator module 316 and an optimization module 320.

The state estimator module 316 determines states for a control loop based on a mathematical model of the engine 102, the states of the engine from a previous (e.g., last) control loop, and the target values 266-270 from the previous control loop. For example, the state estimator module 316 may determine the states for a control loop based on the relationships:

$$x(k)=Ax(k-1)+Bu(k-1)+B_v v(k-1); \text{ and}$$

$$y(k)=Cx(k),$$

where k is a k-th control loop, $x(k)$ is a vector with entries indicative of states of the engine 102 for the k-th control loop, $x(k-1)$ is the vector $x(k)$ from the k−1th control loop, A is a matrix including constant values calibrated based on characteristics of the engine 102, B is a matrix including constant values calibrated based on characteristics of the engine 102, $u(k-1)$ is a vector of including entries for the target values 266-270 used during the last control loop, $y(k)$ is a linear combination of the vector $x(k)$, C is a matrix including constant values calibrated based on characteristics of the engine 102, $B_v$ is a matrix including constant values calibrated based on characteristics of the engine, and v is a matrix including measured disturbances. Measured disturbances model include parameters that impact engine behavior but cannot be directly manipulated, such as ambient pressure and/or temperature. One or more of the state parameters may be adjusted based on measured or estimated values of those parameters, collectively illustrated by feedback inputs 330. The state estimator module 316 may determine the states, for example, using a Kalman filter or another suitable type of state estimator.

The functions performed by the MPC module 312 can be generally described as follows. For k=1, . . . , N, N being in integer greater than one, do:
 (1) use the above equations and the feedback inputs 330 to obtain estimates of the states of the engine 102 at time k;
 (2) calculate optimal values for the target values 266-270 for the time k to minimize a cost function during the period from the time k to a future time k+p; and
 (3) set the target values 266-270 to the calculated optimal values for time k+1 only. Then return to (1) for the next control loop.

The period between times k and k+p refers to a prediction horizon.

The cost function is the performance criterion to be minimized in the optimal control problem defined over the prediction horizon at each control loop. This function reflects the desired control goals. It may be, for example, the sum of different terms corresponding to tracking errors, for example, $\Sigma_i|(u(i)-u_{ref}(i))|^2$, for the manipulated variables to track some reference positions, $\Sigma_i|(y(i)-y_{ref}(i))|^2$, for the controlled variables to track some desired setpoint values, control effort, for example, $\Sigma_i|(u(i))|^2$ or $\Sigma_i|(\Delta u(i))|^2$, and a penalty term for constraint violation. More generally, the cost function depends on manipulated variables u, changes in the manipulated variables from the last control loop $\Delta u$, the controlled variables y, and constraint violation penalty variable $\epsilon$. The target values 266-270 may be referred to as manipulated variables and are denoted by the variable u. Predicted parameters may be referred to as controlled variables and may be denoted by the variable y.

An actuator constraint module 360 (FIG. 2) may set actuator constraints 348 for the target values 266-270. For example, the actuator constraint module 360 may set an actuator constraint for the throttle valve 112, an actuator constraint for the EGR valve 170, an actuator constraint for the wastegate 162, an actuator constraint for the intake cam phaser 148, and an actuator constraint for the exhaust cam phaser 150.

The actuator constraints 348 for the target values 266-270 may include a maximum value for an associated target value and a minimum value for that target value. The actuator constraint module 360 may generally set the actuator constraints 348 to predetermined operational ranges for the associated actuators. More specifically, the actuator constraint module 360 may generally set the actuator constraints 348 to predetermined operational ranges for the throttle valve 112, the EGR valve 170, the wastegate 162, the intake cam phaser 148, and the exhaust cam phaser 150, respectively. However, the actuator constraint module 360 may selectively adjust one or more of the actuator constraints 348 under some circumstances.

An output constraint module 364 (FIG. 2) may set output constraints 352 for the controlled variables (y). The output constraints 352 for the controlled variables may include a maximum value for that controlled variable and a minimum value for that controlled variable. The output constraint module 364 may generally set the output constraints 352 to predetermined ranges for the associated controlled variables, respectively. However, the output constraint module 364 may vary one or more of the output constraints 352 under some circumstances.

A reference module 368 (FIG. 2) generates reference values 356 for the target values 266-270, respectively. The reference values 356 include a reference for each of the target values 266-270. In other words, the reference values 356 include a reference wastegate opening area, a reference throttle opening area, a reference EGR opening area, a reference intake cam phaser angle, and a reference exhaust cam phaser angle. The reference module 368 may determine the reference values 356, for example, based on the air torque request 265, the base air torque request 308, and/or one or more other suitable parameters.

The optimization module 320 determines the target values 266-270 using a Dantzig quadratic programming (QP) solver. A QP solver solves an optimization problem with a quadratic cost function under inequality constraints. For example, if the vector $$x = \mathbb{R}^n$$

represents some optimization variables, quadratic functions of x can be put into the following form:

$$\frac{1}{2}x^T Q x - h^T x + \text{Constant},$$

where Q is an n×n constant symmetric positive definite matrix, Constant is a constant value, and $$h \in \mathbb{R}^n$$

h is a vector that is constant for each control loop, but can vary from control loop to control loop. Linear constraints are in the form of $$Cx \leq b,$$

where C is a constant matrix and b is a vector that is constant for each control loop, but can vary from control loop to control loop.

The following will be described in terms of $n_u$ referring to the number of target values (e.g., 5 in the above example) and $n_y$ referring to the number of controlled variables.

$$u(k) = (u1(k), \ldots, un_u(k)),$$

$$y(k) := (y1(k), \ldots, yn_y(k)), \text{ and}$$

$$\Delta ui(k) = (u1(k), \ldots, un_u(k)),$$

where i is an integer between 1 and $n_u$.

The control problem to be solved can be written as:
Minimize:

$$J(\Delta u, \epsilon) := \rho \epsilon^2 + \Sigma_{k=0}^{p-1} \Sigma_{i=1}^{nu} |w_{\Delta ui} \Delta u_i(k)|^2 + \Sigma_{k=0}^{p-1} \Sigma_{i=1}^{nu} |w_{ui}(u_i(k) - u_{ref,i}(k))|^2 + \Sigma_{k=1}^{p} \Sigma_{i=1}^{ny} |w_{y,i}(y_i(k) - Y_{ref,i}(k))|^2,$$

under the constraints $$y_{min,i} - \epsilon v_y \leq y_i(k) + \leq y_{max,i} + \epsilon v_y, \text{ where } i=1,\ldots,n_y \text{ and } k=1,\ldots,p,$$

$$u_{min,i} - \epsilon v_u \leq u_i(k) \leq u_{max,i} + \epsilon v_u, \text{ where } i=1,\ldots,n_u \text{ and } k=0,\ldots,p-1, \text{ and}$$

$$\Delta u_{min,i} - \epsilon v_{\Delta u} \leq \Delta u_i(k) \leq \Delta u_{max,i} + \epsilon v_{\Delta u}, \text{ where } i=1,\ldots,n_u \text{ and } k=0,p-1,$$

where, as described above, $$y(k) = Cx(k), \quad (1)$$

while satisfying $$x(k) = Ax(k-1) + Bu(k-1) + B_v v(k-1). \quad (2)$$

$w_{\Delta u}$, $w_u$, and $w_y$ are predetermined weighting values which are positive. $v_{\Delta u}$, $v_u$, and $v_y$ are predetermined soft constraint values which are greater than or equal to zero. The predetermined constraint values may be set to zero, for example, to cause hard constraints on the respective parameter. Values with the subscript of min and max denote upper and lower constraints for the respective parameter.

The manipulated variables u or the changes in the manipulated variables Δu could be used as values to be optimized (via the optimization problem). The following example will be described in terms of the changes in the manipulated variables Δu being the values to be optimized. Based on equations (1) and (2), above, and induction:

$$x(1) = Ax(0) + Bu(0) + B_v v(0),$$

$$x(2) = Ax(1) + Bu(1) + B_v v(1) = A^2 x(10) + ABu(0) + Bu(0) + AB_v v(0) + B_v v(1)$$

$$\vdots$$

$$x(k) = A^k x(0) + \sum_{i=0}^{k-1} A^{k-1-i} Bu(i) + \sum_{i=0}^{k-1} A^{k-1-i} B_v v(i).$$

Therefore, $$y(k) = CA^k x(0) + C\Sigma_{i=0}^{k-1} A^{k-1-i} Bu(i) + C\Sigma_{i=0}^{k-1} A^{k-1-i} B_v v(i). \quad (3)$$

Re-writing in terms of Δu yields $$y(k) = CA^k x(0) + C\Sigma_{i=0}^{k-1} A^{k-1-i} B(u(i-1) + \Sigma_{i=0}^{k-1} \Delta u(j)) + C\Sigma_{i=0}^{k-1} A^{k-1-i} B_v v(i), \quad (4)$$

where u(1) is a matrix including the target values of the previous control loop and x(0) is a matrix including the state parameters for the current control loop provided by the state estimator module 316.

To simply the notation, define $$\Delta U := (\Delta u(0), \ldots, \Delta u(p-1)),$$

$$U := (u(0), \ldots, u(p-1)),$$

$$V := (v(0), \ldots, v(p)), \text{ and}$$

$$Y := (y(1), \ldots, y(p)).$$

Then $$U = 1_p u(-1) + J_{\Delta u} \Delta U, \quad (5)$$

where $$1_p = \begin{pmatrix} Id_{nu} \\ \vdots \\ Id_{nu} \end{pmatrix}, \text{ and}$$

$$J_{\Delta u} = \begin{pmatrix} Id_{nu} & 0 & \cdots & 0 \\ Id_{nu} & Id_{nu} & \cdots & 0 \\ \vdots & \vdots & \ddots & \vdots \\ Id_{nu} & Id_{nu} & \cdots & Id_{nu} \end{pmatrix}, \text{ and}$$

$$Y = S_X x(0) + S_{u1} u(-1) + S_u \Delta U + H_v V, \quad (6)$$

where $$S_X := \begin{pmatrix} CA \\ CA^2 \\ \vdots \\ CA^p \end{pmatrix} \in \mathbb{R}^{pn_y \times n_x},$$

$$S_{u1} := \begin{pmatrix} CB \\ CB + CAB \\ \vdots \\ \sum_{i=0}^{p-1} CA^i B \end{pmatrix} \in \mathbb{R}^{pn_y \times n_u},$$

$$S_u := \begin{pmatrix} CB & 0 & \cdots & 0 \\ CB + CAB & CB & \cdots & 0 \\ \cdots & \cdots & \cdots & \cdots \\ \sum_{i=0}^{p-1} CA^i B & \sum_{i=0}^{p-2} CA^i B & \cdots & CB \end{pmatrix} \in \mathbb{R}^{pn_y \times n_u}, \text{ and}$$

$$H_v := \begin{pmatrix} CB_v & 0 & \cdots & 0 \\ CAB_v & CB_v & \cdots & 0 \\ \cdots & \cdots & \cdots & \cdots \\ CA^{p-1}B_v & CA^{p-2}B_v & \cdots & CB_v \end{pmatrix} \in \mathbb{R}^{pn_y \times pn_v}.$$

In order to reduce the size of the optimization problem, the optimization module 320 applies a blocking-move technique. Let $n_c$ be the number of free control moves. Let $J_m$ be the matrix corresponding to a given blocking move structure for $\Delta U$. Then, $J_m$ is a matrix of size $pn_u \times n_c$ that includes only $n_c$ identities $I_{nu}$ at appropriate positions and zeros. Let z be the new optimization variables (all of the free-move variables). By construction then:

$$\Delta U = J_m z.$$

Using z, equation (6) can be re-written as $$Y = S_X x(0) + S_{u1} u(-1) + S_u J_m z + H_v V, \quad (7)$$

In terms of the cost function provided above, $$w_{\Delta u} := \begin{pmatrix} w_{\Delta u,1} & \cdots & 0 \\ \vdots & \ddots & \vdots \\ 0 & \cdots & w_{\Delta u, nu} \end{pmatrix},$$

$$w_u := \begin{pmatrix} w_{u,1} & \cdots & 0 \\ \vdots & \ddots & \vdots \\ 0 & \cdots & w_{u, nu} \end{pmatrix},$$

$$w_y := \begin{pmatrix} w_{y,1} & \cdots & 0 \\ \vdots & \ddots & \vdots \\ 0 & \cdots & w_{y, ny} \end{pmatrix}, \text{ and}$$

are matrices including the weighting values. To simply notation, $$W_{\Delta u} := \begin{pmatrix} w_{\Delta u} & \cdots & 0 \\ \vdots & \ddots & \vdots \\ 0 & \cdots & w_{\Delta u} \end{pmatrix},$$

$$W_u := \begin{pmatrix} w_u & \cdots & 0 \\ \vdots & \ddots & \vdots \\ 0 & \cdots & w_u \end{pmatrix}, \text{ and}$$

$$W_y := \begin{pmatrix} w_y & \cdots & 0 \\ \vdots & \ddots & \vdots \\ 0 & \cdots & w_y \end{pmatrix}.$$

In these matrices, the number of diagonal blocks is equal to the length of the prediction horizon.

Using this notation, the cost function can be re-written as:

$$J(\Delta U, \epsilon) := \rho_\epsilon \epsilon^2 + \Delta U^T W_{\Delta U}^2 \Delta U + (U - U_{REF})^T W_U^2 (U - U_{REF}) + (Y - Y_{REF})^T W_y^2 (Y - Y_{REF}). \quad (8)$$

Removing all of the constant terms from the cost function and expressing J in terms of $\Delta U$ and $\epsilon$, $$\|U - U_{REF}\|^2 = U^T W_U^2 U - 2 U_{REF}^T W_U^2 U =$$
$$\Delta U^T J_{\Delta U}^T W_U^2 J_{\Delta U} + 2[u(-1)^T 1_p^T W_U^2 J_{\Delta U} - U_{REF}^T W_U^2 J_{\Delta U}] \Delta U,$$

and $\|Y - Y_{REF}\|^2 = Y^T W_Y^2 Y - 2 Y_{REF}^T W_Y^2 Y =$ $$\Delta U^T S_U^T W_y^2 S_U \Delta U + 2[x(0)^T S_x^T + u(-1)^T S_{u1}^T - Y_{REF}^T + V^T H_v^T] W_y^2 S_u \Delta U.$$

This implies that $$J(\Delta U, \epsilon) = \rho_\epsilon \epsilon^2 + \Delta U^T (W_{\Delta U}^2 + J_{\Delta U}^T W_U^2 J_{\Delta U} + S_u^T W_y^2 S_u)$$
$$\Delta U + 2[u(-1)^T (1_p^T W_U^2 J_{\Delta U} - S_{u1}^T W_y^2 S_u) -$$
$$U_{REF}^T W_U^2 J_{\Delta U} + x(0)^T S_X^T W_y^2 S_u - Y_{REF}^T W_y^2 S_u +$$
$$V^T H_V^T W_y^2 S_u] \Delta U.$$

Replacing $\Delta U$ with $J_m z$ yields $$J(\Delta U, \epsilon) = \rho_\epsilon \epsilon^2 + z^T J_m^T (W_{\Delta U}^2 + J_{\Delta U}^T W_U^2 J_{\Delta U} +$$
$$S_u^T W_y^2 S_u) J_m z + 2[u(-1)^T (1_p^T W_U^2 J_{\Delta U} -$$
$$S_{u1}^T W_y^2 S_u) - U_{REF}^T W_U^2 J_{\Delta U} + x(0)^T S_X^T W_y^2 S_u -$$
$$Y_{REF}^T W_y^2 S_u + V^T H_V^T W_y^2 S_u] J_m z.$$

Now introducing the following $K_z := 2 J_m^T (W_{\Delta u}^2 + J_{\Delta u}^T W_u^2 J_{\Delta u} + S_u^T W_y^2 S_u) J_m,$ $K_x := S_x^T W_y^2 S_u J_m,$ $K_{u1} = (1_p^T W_u^2 J_{\Delta u} + S_{u1}^T W_y^2 S_u) J_m,$ $K_{ut} = -W_u^2 J_{\Delta u} J_m,$ $K_r = -W_y^2 S_u J_m,$ and $K_v = H_v^T W_y^2 S_u J_m.$ Given these definitions, the cost function can be re-written as:

$$J(\Delta U, \epsilon) = \rho_\epsilon \epsilon^2 + \frac{1}{2} z^T K_z z + \quad (9)$$
$$(Y_{REF}^T K_r + V^T K_v + U_{REF}^T K_{ut} + u(-1)^T K_{u1} + x(0)^T K_x) z.$$
$$:= \rho_\epsilon \epsilon^2 + \frac{1}{2} z^T K_z z - K_{current}^T z.$$

The constraints and satisfaction of the constraints can be re-written as follows.

$V_y = (v_y, \ldots, v_y)^T,$ $V_u = (v_u, \ldots, v_u)^T,$ $V_{\Delta u} = (V_{\Delta u}, \ldots, v_{\Delta u})^T$ $Y_{min} - \epsilon V_y \leq Y \leq Y_{max} + \epsilon V_y,$ $U_{min} - \epsilon V_u \leq U \leq U_{max} + \epsilon V_u$ $\Delta U_{min} - \epsilon V_{\Delta u} \leq \Delta U \leq \Delta U_{max} + \epsilon V_{\Delta u}.$ From equations (5) and (6), the following can be obtained.

$$\begin{pmatrix} Y_{min} \\ U_{min} \\ \Delta U_{min} \end{pmatrix} - \epsilon \begin{pmatrix} V_y \\ V_u \\ V_{\Delta u} \end{pmatrix} \leq$$

$$\begin{pmatrix} S_u \\ J_{\Delta u} \\ I \end{pmatrix} \Delta U + \begin{pmatrix} S_x x(0) + S_{u1} u(-1) + H_v V \\ 1_p u(-1) \\ 0 \end{pmatrix} \leq \begin{pmatrix} Y_{max} \\ U_{max} \\ \Delta U_{max} \end{pmatrix} + \epsilon \begin{pmatrix} V_y \\ V_u \\ V_{\Delta u} \end{pmatrix}$$

or equivalently $$\begin{pmatrix} S_u \\ J_{\Delta u} \\ I \end{pmatrix} J_m z - \epsilon \begin{pmatrix} V_y \\ V_u \\ V_{\Delta u} \end{pmatrix} \leq \begin{pmatrix} Y_{max} \\ U_{max} \\ \Delta U_{max} \end{pmatrix} - \begin{pmatrix} S_x x(0) + S_{u1} u(-1) + H_v V \\ 1_p u(-1) \\ 0 \end{pmatrix}$$

and $$-\begin{pmatrix} S_u \\ J_{\Delta u} \\ I \end{pmatrix} J_m z - \epsilon \begin{pmatrix} V_y \\ V_u \\ V_{\Delta u} \end{pmatrix} \leq -\begin{pmatrix} Y_{min} \\ U_{min} \\ \Delta U_{min} \end{pmatrix} + \begin{pmatrix} S_x x(0) + S_{u1} u(-1) + H_v V \\ 1_p u(-1) \\ 0 \end{pmatrix}.$$

Using the following definitions, $$M_z := \begin{pmatrix} S_u J_m \\ -S_u J_m \\ J_{\Delta u} J_m \\ -J_{\Delta u} J_m \\ J_m \\ -J_m \end{pmatrix}, M_\epsilon := -\begin{pmatrix} V_y \\ V_y \\ V_u \\ V_u \\ V_{\Delta u} \\ V_{\Delta u} \end{pmatrix}, M_{lim} := \begin{pmatrix} Y_{max} \\ -Y_{min} \\ U_{max} \\ -U_{min} \\ \Delta U_{max} \\ -\Delta U_{min} \end{pmatrix},$$

$$M_x := \begin{pmatrix} -S_x \\ S_x \\ 0 \\ 0 \\ 0 \\ 0 \end{pmatrix}, M_{u1} := \begin{pmatrix} -S_{u1} \\ S_{u1} \\ -1_p \\ 1_p \\ 0 \\ 0 \end{pmatrix}, M_v := \begin{pmatrix} -H_v \\ H_v \\ 0 \\ 0 \\ 0 \\ 0 \end{pmatrix},$$

yields $$M_z z + M_\epsilon \epsilon \leq M_{lim} + M_v V + M_x x(0) + M_{u1} u(-1) := M_{lim} + M_{current} \quad (10)$$

In the $M_z$ matrix, the block $$\begin{pmatrix} J_M \\ -J_M \end{pmatrix}$$

can be reduced to $$\begin{pmatrix} I_Z \\ -I_Z \end{pmatrix}$$

by removing all of the rows of zeros corresponding to all of the $\Delta u$s, which are blocked to zero, where $I_z$ denotes the identity matrix of the size z. The other M matrices are also similarly reduced by removing unnecessary rows. A similar reduction can be performed for the block $$\begin{pmatrix} J_{\Delta u} J_M \\ -J_{\Delta u} J_M \end{pmatrix}$$

corresponding to the actuator constraints.

The predicted parameters (y values) are constrained over the entire prediction horizon. It is possible, however, to choose specific time steps over the prediction horizon where the output constraints are imposed. In this case, only the rows corresponding to these time steps in the block $$\begin{pmatrix} S_u J_M \\ -S_u J_M \end{pmatrix}$$

are kept in the $M_z$ matrix, and all of the other M matrices are modified accordingly by removing unnecessary rows.

The matrices $K_z$ and $M_z$ and the vectors $M_\epsilon$ and $M_{lim}$ are constant for a given linear model. The vectors $K_{current}$ and $M_{current}$ depend on the current state estimated by the state estimator module 316 and the target values 266-270 from the last control loop (i.e., the most recent control action) and are updated each control loop before being used by the optimization module 320 to determine the target values 266-270 for the current control loop.

Using these notations, the QP problem solved by the optimization module 320 each control loop can be re-written as:

$$\min_{z,\epsilon} \rho_\epsilon \epsilon^2 + \frac{1}{2} z^T K_z z - K_{current}^T z,$$

subject to the constraints $$M_z z + M_\epsilon \epsilon \leq M_{lim} + M_{current}.$$

The above optimization problem has the following form minimize:

$$\frac{1}{2} x^T Q x - h^T x,$$

under the constraints $$Cx \leq d,$$

where $x \in \mathbb{R}^n$, $Q \in \mathbb{R}^{n \times n}$, $C \in \mathbb{R}^{m \times n}$, and $d \in \mathbb{R}^m$.

The use of superscript T denotes transpose usage.

According to the Karush-Kuhn-Tucker (KKT) Theorem, $x^* \in \mathbb{R}^n$ is the unique solution of the QP problem if and only if there exists $\lambda^* \in \mathbb{R}^m$, such that:
(i) $(x^*, \lambda^*)$ satisfies $$Qx^* - h - C^T \lambda^* = 0, \qquad (11)$$

(ii) $Cx^* \leq d$, $\lambda^* \geq 0$, and
(iii) $\lambda^{*T}(d - Cx^*) = 0$.

Above, (ii) involves primal and dual constraint satisfaction, and (iii) involves complementarity. x may be referred to as a primal variable. λ may be referred to as a Lagrange multiplier or a dual variable. For QP optimization problems subject to constraints, an optimal solution includes an optimal pair of primal and dual variables.

A new variable y can be introduced, where $$y = d - Cx.$$

Accordingly, $y^* = d - Cx^*$. To express conditions (ii) and (iii) in terms of $\lambda^*$ and $y^*$, yields
(i) $\lambda^* \geq 0$, $Cx^* \leq d \Leftrightarrow \lambda^* \geq 0$, $y^* \geq 0$, and
(ii) $\lambda^{*T}(d - Cx^*)^{=0} \geq 0 \Leftrightarrow \lambda^* = 0$.

Solving for $x^*$, we have $$x^* = Q^{-1}(h - C^T \lambda^*).$$

Therefore, $$y^* = d - Cx^* = d - C[Q^{-1}(h - C^T \lambda^*)], \text{ and}$$

$$y^* = d - CQ^{-1}(h - C^T \lambda^*)] = d - CQ^{-1}h + CQ^{-1}C^T \lambda^*.$$

Letting $\tilde{d} := d - CQ^{-1}h$ and $\tilde{Q} := CQ^{-1}C^T,$ we have $y^* = \tilde{d} - \tilde{Q} \lambda^*.$ using the above notation, the conditions in relationship (11) are equivalent to,
(i) $(x^*, \lambda^*)$ satisfies $$\tilde{d} = (I - \tilde{Q})\begin{pmatrix} y^* \\ \lambda^* \end{pmatrix},$$

(ii) $\lambda^* \geq 0$, $y^* \geq 0$, and
(iii) $\lambda^{*T} y^* = 0$.
I is an identity matrix.
$x^*$ can therefore be determined using the equation $$x^* = Q^{-1}(h - C^T \lambda^*).$$

A solver that solves for the optimal pair $(x^*, \lambda^*)$ which satisfies the conditions (i)-(iii) may be referred to as a dual solver. The optimization module 320 includes a dual solver and solves for the optimal pair $(x^*, \lambda^*)$, as described above.

$x^*$ includes optimal values corresponding to changes in the target values 266-270 from the previous control loop (e.g., k−1). The optimization module 320 adjusts the target values 266-270 from the previous control loop based on the values of $x^*$, respectively, to generate the target values 266-270 for the current control loop for controlling the respective actuators. For example only, the optimization module 320 may sum the target values 266-270 with the values of $x^*$, respectively, to generate the target values 266-270 for the current control loop. These target values 266-270 will be used to control the respective actuators.

The above could be re-written as $$w - Au = q, \text{ and} \qquad (12)$$

$u^T w = 0$, $u \geq 0$, and $w \geq 0$, where $w = y^*$, $u = \lambda^*$, $A = \tilde{Q}$, and $q = \tilde{d}$, with w and u in $\mathbb{R}^m$. A is an m×m positive matrix that is known, and the vector $q \in \mathbb{R}^n$ is known.

The problem of finding (w, u) that satisfy the above may be referred to as a Linear Complementarity Problem (LCP) and is solved by the optimization module 320. Specifically, this form may be used by a Dantzig QP solver. The symmetric matrix A and the vector q include predetermined data. The A matrix may be referred to as a tableau. The size of the tableau affects the number of computations necessary to generate the target values 266-270.

In relationship (12), there are 2n unknowns in the LCP (w and u), and there are n linear equations. In order to determine w and u, n more equations are needed. Writing the conditions of relationship (12) more simply, we have $\sum_{i=1}^m w_i u_i = 0,$ $w_i \geq 0$, and $u_i \geq 0$.

This implies $w_i u_i = 0$ for $i = 1 \ldots m$. Therefore, there are at least n zeros among all of the 2 n components of w and u. The Dantzig QP solver determines iteratively the correct combination of zero and non-zero components for w and u such that relationship (12) and its conditions are simultaneously.

The Dantzig QP solver applied to an LCP is an extension of a simplex solver for linear programming. Relationship (12) has at most n non-zero components. Basic solutions for relationship (12) are only ones that need to be considered in the process of solving due to the conditions of relationship (12). For a given basic solution, all of the components with non-zero values may be referred to as basic variables.

A basic primal feasible solution is a basic solution where all of the primal variables are non-negative. A basic dual feasible solution is a basic solution where all of the dual variables are non-negative. A basic feasible solution may be said to be in standard form if no pair of corresponding w components and u components includes two non-zero elements. In standard form, exactly one element of each pair $(w_i, u_i)$ is zero (i=1, . . . , m). If a basic feasible solution is in standard form, the corresponding tableau may also said to be in standard form. A basic feasible solution may said to be in non-standard form if it is not in standard form, i.e., it has pairs of each pair $(w_i, u_i)$ such that both components are zero or both non-zero.

The following variables will now be used. N refers to the number of constraint variables w, and is equal to m. NUC is the number of unconstrained variables, and may be equal to zero in this example. BV is a vector of values of the basic variables and is determined iteratively by the optimization module 320 and is initialized to BV=q.

IB is an index vector of size N for u. If IB(I)>0, $w_I$ is a basic variable and $w_I$=BV(IB(I)). If IB(I)<0, $w_I$ is a non-basic variable and $w_I$=0, and −IB(I) is its column number in the tableau A. IL is an index vector of size N for w. If IL(I)>0, $u_I$ is a basic variable and $u_I$=BV(IB(I)). If IB(I)<0, $u_I$, is a non-basic variable and $u_I$=0, and −IB(I) is its column number in the tableau A. A is the initial tableau and it's modified iteratively by the optimization module 320.

IRET is a return value indicating that the optimization has terminated. IRET>0 indicates that the optimal solution has been found, and IRET indicates the number of iterations used to obtain the optimal solution. IRET=−1 indicates an index of an infeasible component in w-variables of the initial BV. IRET=−3N indicates that it is impossible to remove a variable from the basis. IRET=−1 and =−3N should not occur.

Generally speaking, the optimization module 320 modifies iteratively basic solutions to relationship (12) in order to find one basic solution that satisfies relationship (12) and the conditions for relationship (12) in a finite number of iterations.

One solution to relationship (12) is that w=q and u=0. In this case, all the conditions of relationship (12) are satisfied except for w≥0. If all of the components of q are positive, the optimization module 320 stops and an optimal solution has been found. Otherwise, the optimization module 320 performs one or more further iterations. Using the terminology above, the basic solution is initialized to a predetermined basic solution:

$$\begin{pmatrix} q \\ 0 \end{pmatrix},$$

and the basic variables are the components of w. This basic solution is only dual feasible if q has at least one negative component. According to the above definitions of the index vectors IL and IB, initially, $IL(i)=I$ for $i=1, \ldots, m$, and $IB=-IL$.

Letting the tableau $\mathcal{A}=(I,M)$ be the tableau and h be the right hand matrix at the current step, the corresponding basic solution is denoted by $z=(z_B, z_N)$, meaning that $\mathcal{A}z=h$, where $z_B$ and $z_N$ are basic and non-basic variables, respectively. It is clear that $z_B$=h and, by definition, $z_N$=0, with $M=\mathcal{A}$ and h=q at initialization. Let $\mathcal{A}_+=(I,M_+)$ and $h_+$ be the tableau and the right hand matrix at the next iteration, respectively. How the optimization module 320 proceeds from $\mathcal{A}$ and h to $\mathcal{A}_+$ and $h_+$ will now be explained.

$$\mathcal{A}z = z_{B,1}E_1 + \ldots + z_{B,N}E_N + z_{N,1} \times M_1 + \ldots + z_{N,N} \times M_N,$$
$$= z_{B,1}E_1 + \ldots + z_{B,N}E_N + 0 \times M_1 + \ldots + 0 \times M_N,$$

where $E_i$ and $M_i$ denote respectively the i-th column of I and M. One iteration of the proceeds as follows:

(i) according to some rules (determine IC and IR), choose column IC in M and column IR in I and exchange these two columns such that $$\tilde{\mathcal{A}} = (E_1 \ldots M_{IC} \ldots E_N, M_1 \ldots E_{IR} \ldots M_N)$$
$$:= (P \ \tilde{M}).$$

(ii) solve $\mathcal{A}z=h$ by pivoting, i.e., by row operations on $\mathcal{A}$ and h to obtain $\mathcal{A}_+=(I,M_+), h_+$, and $z_{B+}=h_+$.

Next, determine variables entering and leaving the basis. When stating that a non-basic variable should enter the basis, it is meant that the column corresponding to that variable in the tableau should replace one column corresponding to a basic variable. When stating that a basic variable should leave the basis, it is meant that the column corresponding to that variable in the tableau should be replaced by one column corresponding to a non-basic variable that should enter the basis.

If the table is in standard form, that non-basic u variable should enter the basis such that the corresponding w variable has the most negative value in h. If the tableau is non-standard, and $(w_i, u_i)$ is the non-basic pair, then $w_i$ should enter the basis. Let $M_{IC}$ be the column of the tableau to enter the basis, and h be the current value of the basic variables. Compute the ratios $h_i/M_{i,IC}$ for all basic u-variables and the variable corresponding to the primary variable associated with the u-variable which is to enter the basis. Delete the variable corresponding to the smallest positive ratio.

Regarding pivoting, if $\mathcal{A}$ is multiplied from the left by $P^{-1}$, we will obtain the identity block $\mathcal{A}_+=P^{-1}\mathcal{A}=(IP^{-1}\tilde{M})$.

Therefore, $M_+=P^{-1}\tilde{M}$, and $h_+=P^{-1}h$. (13)

The optimization module 320 updates the tableau and the basic solution according to relationship (13).

$P^{-1}$, however, needs to be computed. P is given by $$P := \begin{pmatrix} 1 & \ldots & 0 & M_{1,IC} & 0 & \ldots & 0 \\ \vdots & \ddots & \vdots & \vdots & \vdots & \ddots & \vdots \\ 0 & \ldots & 1 & M_{IR-1,IC} & 0 & \ldots & 0 \\ 0 & \ldots & 0 & M_{IR,IC} & 0 & \ldots & 0 \\ 0 & \ldots & 0 & M_{IR+1,IC} & 1 & \ldots & 0 \\ \vdots & \ldots & \vdots & \vdots & \vdots & \ddots & \vdots \\ 0 & \ldots & 0 & M_{N,IC} & 0 & \ldots & 1 \end{pmatrix}.$$

The optimization module 320 verifies that $$P^{-1} = \begin{pmatrix} 1 & \ldots & 0 & -\frac{M_{1,IC}}{M_{IR,IC}} & 0 & \ldots & 0 \\ \vdots & \ddots & \vdots & \vdots & \vdots & \ddots & \vdots \\ 0 & \ldots & 1 & -\frac{M_{IR-1,IC}}{M_{IR,IC}} & 0 & \ldots & 0 \\ 0 & \ldots & 0 & \frac{1}{M_{IR,IC}} & 0 & \ldots & 0 \\ 0 & \ldots & 0 & -\frac{M_{IR+1,IC}}{M_{IR,IC}} & 1 & \ldots & 0 \\ \vdots & \ldots & \vdots & \vdots & \vdots & \ddots & \vdots \\ 0 & \ldots & 0 & -\frac{M_{N,IC}}{M_{IR,IC}} & 0 & \ldots & 1 \end{pmatrix}.$$

Pivoting may be the most (computational) time consuming operation performed by the optimization module 320 to obtain the optimal solution. Relative to the computational time to perform the pivoting, all other operations of the Dantzig QP solver may be negligible.

Let g be a vector of size N, and let E(i, g) be the matrix obtained by replacing the i-th column of the identity matrix by g, such that $$E(i,g) := \begin{pmatrix} 1 & \ldots & 0 & g_1 & 0 & \ldots & 0 \\ \vdots & \ddots & \vdots & \vdots & \vdots & \ddots & \vdots \\ 0 & \ldots & 1 & g_{i-1} & 0 & \ldots & 0 \\ 0 & \ldots & 0 & g_i & 0 & \ldots & 0 \\ 0 & \ldots & 0 & g_{i+1} & 1 & \ldots & 0 \\ \vdots & \ldots & \vdots & \vdots & \vdots & \ddots & \vdots \\ 0 & \ldots & 0 & g_N & 0 & \ldots & 1 \end{pmatrix}.$$

E(i,g) may be referred to as an elementary matrix. In view of the above, P and $P^{-1}$ are also identity matrices.

Letting a be any vector of size N, $$E(i,g)a = \begin{pmatrix} a_1 \\ \vdots \\ a_{i-1} \\ 0 \\ a_{i+1} \\ \vdots \\ a_N \end{pmatrix} + a_i g = \begin{pmatrix} a_1 + a_i g_1 \\ \vdots \\ a_{i-1} + a_i g_{i-1} \\ a_i g_i \\ a_{i+1} + a_i g_{i+1} \\ \vdots \\ a_N + a_i g_N \end{pmatrix}.$$

In view of the above, it is clear that the number of operations performed to compute E(i, g) a scales linearly with N, while the number of operations required to compute general matrix-vector products scales quadratically with vector size.

As described above, letting (IR,IC) be the position of pivoting, the following matrix multiplication would be performed at each iteration.

$$\begin{pmatrix} 1 & \ldots & 0 & -\frac{M_{1,IC}}{M_{IR,IC}} & 0 & \ldots & 0 \\ \vdots & \ddots & \vdots & \vdots & \vdots & \ddots & \vdots \\ 0 & \ldots & 1 & -\frac{M_{IR-1,IC}}{M_{IR,IC}} & 0 & \ldots & 0 \\ 0 & \ldots & 0 & \frac{1}{M_{IR,IC}} & 0 & \ldots & 0 \\ 0 & \ldots & 0 & -\frac{M_{IR+1,IC}}{M_{IR,IC}} & 1 & \ldots & 0 \\ \vdots & \ldots & \vdots & \vdots & \vdots & \ddots & \vdots \\ 0 & \ldots & 0 & -\frac{M_{N,IC}}{M_{IR,IC}} & 0 & \ldots & 1 \end{pmatrix}$$

$$\begin{pmatrix} M_{1,1} & \ldots & M_{1,IC-1} & 0 & M_{1,IC+1} & \ldots & M_{1,N} \\ \vdots & \ddots & \vdots & \vdots & \vdots & \ddots & \vdots \\ M_{IR-1,1} & \ldots & M_{IR-1,IC-1} & 0 & M_{IR-1,IC+1} & \ldots & M_{IR-1,N} \\ 0 & \ldots & 0 & 1 & 0 & \ldots & 0 \\ M_{IR+1,1} & \ldots & M_{IR+1,IC-1} & 0 & M_{IR+1,IC+1} & \ldots & M_{IR+1,N} \\ \vdots & \ldots & \vdots & \vdots & \vdots & \ddots & \vdots \\ M_{N,1} & \ldots & M_{N,IC-1} & 0 & M_{N,IC+1} & \ldots & M_{N,N} \end{pmatrix}$$

As also stated above, however, only the values of the basic variables are needed to determine IC (i.e., no information is needed from the tableau is needed) and, after IC is determined, only the IC-th column of the tableau needs to be up-to-date in order to perform the remaining iterations to determine IR.

For example, at iteration n during a control loop and the index IC has been determined based on the updated values of the basic variables. The question then is how the IC-th column of the initial tableau is updated during the n−1 earlier iterations. Letting $P_1^{-1}, \ldots, P_{n-1}^{-1}$ be the elementary (left hand side) matrices used during the n−1 earlier iterations, they are all in the form of $E(IR_k, g_k)$ where $IR_k$ is the pivot row selected at iteration k and $g_k$ is the column vector obtained from the pivot column at iteration k. Let $g_n$ be what the IC-th column of the tableau should be at the current iteration. In a first case, the IC-th column of the tableau has not been selected in previous iterations of the present control lop. In this case, let $g_0$ be the IC-th column of the initial tableau, $$g_n = P_{n-1}^{-1} \ldots P_1^{-1} g_0,$$

which scales with (n−1)N. In a second case, the IC-th column of the tableau was selected during a previous iteration of the present control loop. In this case, letting k be the latest iteration at which the IC-th column was used, and letting $IR_k$ be the index for the selected row at that iteration, the IC-th column needs to be related by $E_{IR_k} = (0, \ldots, 0, 1, 0, \ldots, 0)^T$ with only the $IR_k^{TH}$ component equal to 1, such that $$g_n = P_{n-1}^{-1} \ldots P_k^{-1} E_{IR_k}.$$

$P_k^{-1}$ is of the form of $E(IR_k, g_k)$ for some $g_k$. Therefore, we have $$E(IR_k, g_k)E_{IR_k} = g_k.$$

Furthermore, $$g_n = P_{n-1}^{-1} \ldots P_{k+1}^{-1} g_k,$$

which scales with n−1−k(N).

In view of the above, the required number of computation at iteration n scales at most with (n−1)N. Therefore, the total run time for n iterations scales with $$(1 + 2 + \ldots + n - 1)N = \frac{(n-1)nN}{2}.$$

If the entire matrix multiplication was performed for each iteration, the total run time would be $nN^2$. The ratio of the above to $nN^2$ is approximately n/2N. A computational efficiency improvement (by way of performance of less computations per iteration) is therefore achieved by the optimization module 320.

Figure 4:
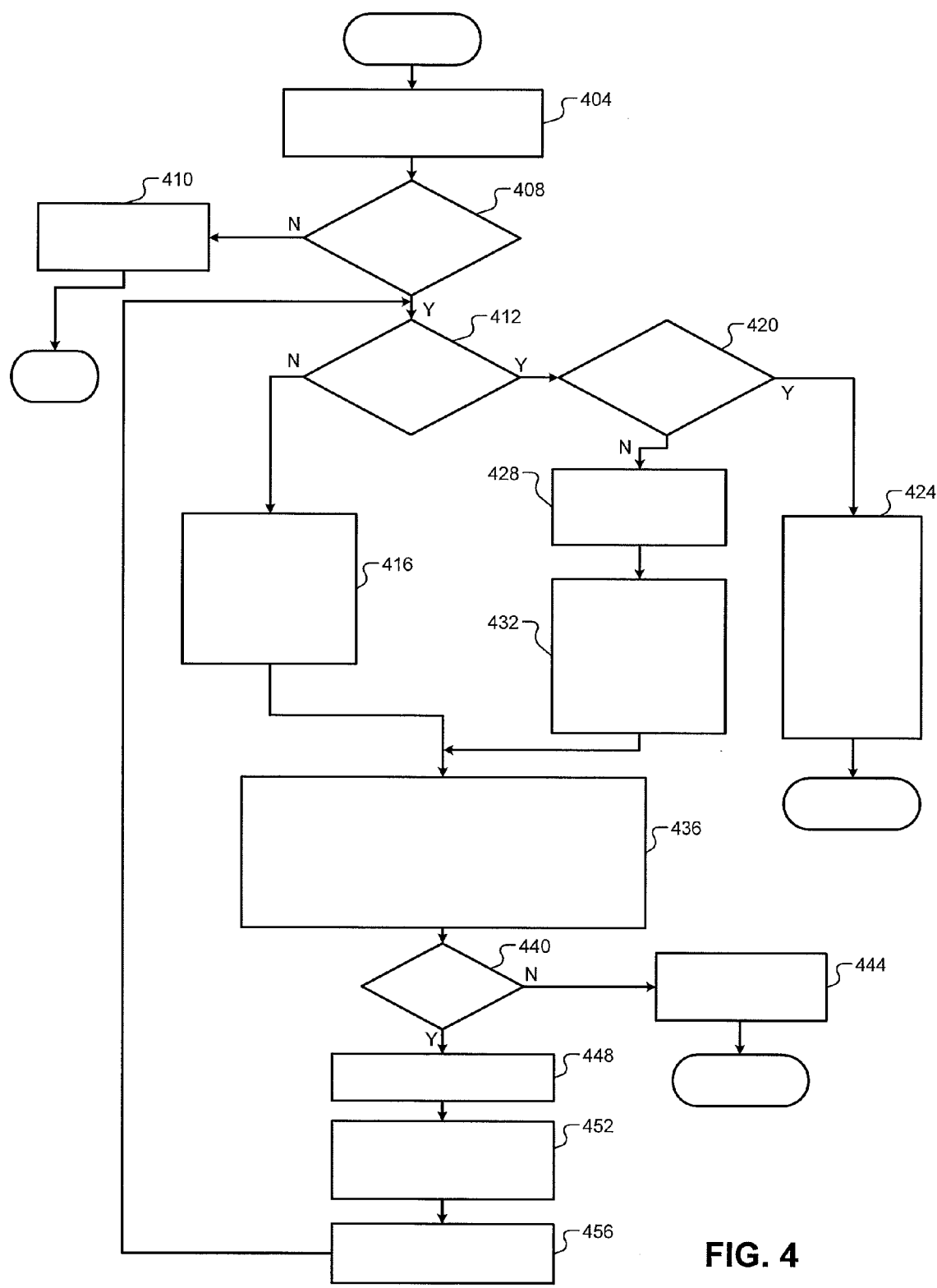
FIG. 4 includes a flowchart depicting an example method of solving an optimization problem and determining target values.

FIG. 4 is a flowchart depicting an example method of solving the optimization problem and determining the target values 266-270. A control loop begins at 404 where the optimization module 320 initializes, setting the initial basic solution BV to the predetermined initial basic solution $$\begin{pmatrix} q \\ 0 \end{pmatrix},$$

and setting the basic variables to the components of w.

At 408, the optimization module 320 determines whether the initial basic solution is dual feasible. The predetermined initial basic solution is dual feasible. As such, if the initial basic solution BV is not dual feasible at 408, the optimization module 320 indicates that a failure has occurred at 410 and sets IRET to a first predetermined value (e.g., −I) indicating that the initial basic solution BV is not dual feasible. If 408 is true, control continues with 412.

At 412, the optimization module 320 determines whether the basic solution BV is in standard form. If the basic solution BV is not in standard form at 412, control continues with 416. The optimization module 320 saves the column position index IC in the tableau of the primal variable of the non-basic pair at 416, and control continues with 436, which is discussed further below. This variable (and therefore its column of the tableau) will enter the basis for the next iteration. If the non-If the basic solution BV is in standard form at 412, control continues with 420.

At 420, the optimization module 320 determines whether all of the primal variables of the basic solution BV are positive. If all of the primal variables are positive at 420, the optimization problem has been solved, and control continues with 424. At 424, the optimization module 424 indicates the number of iterations needed to solve the optimization problem for the present control loop. The d vector then includes the λ* values, which are used to determine the values, as described above. The x* values are delta values for the target values 266-270, respectively. The optimization module 320 sets the target values 266-270 for the present control loop equal to sums of the target values 266-270 from the previous control loop plus the delta values, respectively. These (updated) target values 266-270 will be used to control the actuators for the current control loop.

If one or more of the primal variables of the basic solution BV are negative at 420, the optimization problem has not yet been solved, and control continues with 428. At 428, the optimization module 320 identifies the most negative primal variable of the basic solution BV. The optimization module 320 saves the column position index IC of the corresponding dual variable in the tableau at 432. This variable (and therefore its column of the tableau) will enter the basis for the next iteration. Control then continues with 436.

At 436 (from either 432 or 416), for each of the components corresponding to the basic dual variables and the primal variables identified, the optimization module 320 determines ratios between the component of the (present) basic solution BV and the corresponding component of the column IC of the tableau. At 440, the optimization module 320 determines whether one or more of the ratios determined are positive. If 440 is false, the optimization module 320 indicates that a failure has occurred at 444 and sets IRET to a second predetermined value (e.g., −3N) indicating that a variable cannot be removed from the basis. If 440 is true, control continues with 448.

At 448, the optimization module 320 identifies a smallest positive one of the ratios determined. At 452, the optimization module 320 stores the column position index IR in the tableau. This variable (and therefore its column of the tableau) will leave the basis for the next iteration. At 456, the optimization module updates the tableau A and the basic solution BV for the next iteration, and control returns to 412 to begin the next iteration of the present control loop. The example of FIG. 4 may be performed for each control loop.

As stated above, the optimization problem is of the form minimize $$\frac{1}{2} x^T Q x - h^T x,$$

under the constraints Cx≤d. The tableau and initial basis of the problem in dual formulation are respectively given by $$A = CQ^{-1}C^T \text{ and}$$

$$q = d - CQ^{-1}h.$$

The optimal primal variable x* can be determined as follows $$x^* = Q^{-1}(h - C^T \lambda^*),$$

where λ* is the optimal dual variable.

Letting $s_x$ be an n×n invertible matrix and $s_c$ be an m×m diagonal matrix with strictly positive diagonal entries, the optimization problem can be re-written as minimize:

$$\frac{1}{2} \bar{x}^T \bar{Q} \bar{x} - \bar{h}^T \bar{x},$$

under the constraints $\overline{Cx} \leq \bar{d}$, with $\bar{Q} = S_x^T Q S_x$, $\bar{h} = S_x^T h$, $\bar{C} = S_c Q S_x$, and $\bar{d} = S_c d$. This is a change of x and a scaling of the constraints. In this case, the tableau and the initial basis of the optimization problem are given by $$A_s = (S_c C S_x)(S_x^T Q S_x)^{-1}(S_c C S_x)^T = S_c C Q^{-1} C^T S_c = S_c A S_c,$$

$$q_s = \bar{d} - \overline{CQ}^{-1}$$
$$\bar{h} = S_c d - S_c C S_x (S_x^T Q S_x)^{-1} S_x^T h = S_c d - S_c C Q^{-1} h = S_c q.$$

Letting $\bar{x}^*$ and $\bar{\lambda}^*$ be the optimal primal and dual variables for the optimization problem, $$\bar{x}^* = (S_x^T Q S_x)^{-1}(S_x^T h - (S_c C S_x)^T \bar{\lambda}^*) = S_x^{-1} Q^{-1}(h - C^T S_c \bar{\lambda}^*).$$

Therefore, $$x^* = Q^{-1}(h - C^T S_c \bar{\lambda}^*).$$

Scaling the constraints is equivalent to scaling the dual variables. To improve numerical stability, the optimization module 320 scales the $S_c$ matrix $$S_{c,ii} = \frac{1}{\sqrt{A_{ii}}}.$$

The scaling narrows the range of possible values, thereby improving accuracy of the optimization results.

One feature of MPC is the ability to anticipate future events and adjust control actions accordingly. This is achieved by solving a sequence of constrained QP problems. Whether MPC can be successfully implemented on an embedded controller strongly depends on how well one can handle the data needed in these optimization problems.

As discussed above, a Dantzig QP solver is used to solve the QP problems. The Dantzig QP solver manipulates a large matrix called tableau, which includes a large number of entries (e.g., several thousands) in order to solve the QP problems and to find the optimal solution. The tableau is stored in ROM (Read Only Memory). The Dantzig QP solver is called at each control-loop to solve a new set of QP problems which depend on the current states and constraints of the system. In order to update the cost function and constraints, several large matrices may also be stored in the ROM.

All of the matrices including the entire tableau could be saved in the ROM and copied for use before the Dantzig QP solver is called. Due to the size of these matrices, storage requires large memory space, and the memory copy is time consuming. These attributes could impact the performance and even the implementability of MPC.

The present application, however, achieves a reduction in ROM usage. The tableau is a symmetric matrix. Therefore, only the lower triangular part of the tableau matrix including the diagonal needs to be saved in ROM, which has $m^*(m+1)/2$ entries in total instead of $m^*m$ entries if the tableau is m×m. The upper triangular part of the matrix is constructed by the MPC module 312 online using symmetry while copying the lower triangular part.

Since symmetry is used, constructed is a vector V1 of size $m^*m$ from a vector V2 of size $m^*(m+1)/2$ by copying the elements of V2 into correct position in V1 and completing missing entries of V1 using symmetry. If V2 is stored in a standard way, such as using stacking columns, and copied into V1 to occupy the first $m^*(m+1)/2$ positions, then only m first entries are at correct positions, and the remaining $m^*(m-1)/2$ elements need to be moved to their correct positions. In the present application V2 is stored in a non-standard way that minimizes the number of elements to be moved while copying V2 into V1.

As stated above, V2 corresponds to the lower triangular part of the tableau matrix. This right-angled triangle is may be called the big triangle. The idea is to "cut" the big triangle vertically to obtain a right-angled trapezoid on the left and a small right-angled triangle on the right, then rotate the small triangle 180 degrees and put it on top of the trapezoid to form a rectangle. This rectangular matrix is then stored in a standard way. It can be shown that if V2 is saved using this structure, then only $(m^*m-1)/8$ elements need to be moved instead of $m^*(m-1)/2$.

Some matrices are used to update the linear part of the cost function. More specifically, $K_{ut}$ and $K_r$ are two large matrices used to update the linear term in the cost function at each control loop. Their special structures are exploited to achieve ROM reduction.

The matrix product of $K_{ut}$ with the reference values of the input signals contributes to updating the cost function. The product results can be obtained much more efficiently by multiplying directly the reference values with their corresponding weight parameters. According to the present application, $K_{ut}$ matrix is not stored in the ROM and unnecessary multiplication with zero(s) is not performed. The $K_{ut}$ matrix is constructed based on one or more other matrices.

The matrix product of $K_r$ with the reference values of the output signals is also needed to update the cost function. The $K_r$ matrix has block structure and is constructed (as opposed to being stored in the ROM) by scaling the rows of another matrix by the corresponding output tracking weight parameters. Therefore, if the tracking weight of some output signal is zero, then the corresponding rows in $K_r$ over the prediction horizon are also equal to zero. It is therefore not necessary to store these rows.

Some matrices are used to update the constraints. The constraints of the QP problem to be solved at each control loop depends on the current state of the system, input signals previously applied, as well as anticipated measured disturbance signal over the prediction horizon. Therefore, three large matrices $M_x$, $M_{u1}$ and $M_v$ are stored in ROM and used at each control loop for the update. A ROM reduction is achieved by exploiting the following structure: all three of these matrices are structured in four row blocks corresponding to mixed constraints, output constraints, input constraints and input rate constraints. All of the block rows corresponding to input and input rate constraints can be recovered efficiently (constructed by the MPC module 312) and are not stored in ROM. All of the rows corresponding to input rate constraints are zero. All of the rows corresponding to input constraints contain either zeros ($M_x$ and $M_v$) or blocks of identity matrices ($M_{u1}$). If output signals have both lower and upper boundary constraints, their corresponding rows in these three matrices differ only by a minus sign. Therefore, at most, only half of the rows corresponding to output constraints need to be stored in ROM.

The K matrices discussed above are modified if one or more of the weighting values changes. As described above, $$K_{ut} = -W_u^2 J_{\Delta u} J_M.$$

it is not necessary to construct the $K_{ut}$ matrix. What's relevant is $U_{ref}^T K_{ut}$, which is a block-row matrix of block size p×$n_c$. If the block move structure is $(p_1, p_2, \ldots, p_{nc})$, the i-th block position is equal to $$u_{ref}^T(p_i) w_u^2 + u_{ref}^T(p_i+1) w_u^2 + \ldots + u_{ref}^T(p) w_u^2 = [u_{ref}^T(p_i) + u_{ref}^T(p_i+1) + \ldots + u_{ref}^T(p)] w_u^2.$$

As also described above, $$K_r = -W_y^2 S_u J_m.$$

Multiplying $S_u J_m$ by $W_y^2$ from the left corresponds to row scaling of $S_u J_m$. Computational efficiency is gained by not scaling rows by 0, which is equivalent to ignoring all of the ys with zero weighting values.

The matrices $M_z$, $M_x$, $M_{u1}$, and $M_v$ may be constructed and/or stored in memory. $M_z K_z^{-1}$ may be stored instead of $M_z$. Mz may be stored if the weighting values change in real time. Generally speaking, the number of rows of the M matrices needed to be stored depends only on the number of y constraints instead of the total number of constraints.

In terms of the Mx matrix, $$M_x = \begin{pmatrix} -S_x \\ S_x \\ 0 \\ 0 \\ 0 \\ 0 \end{pmatrix},$$

so only the rows of $S_x$ corresponding to the constrained y values can be stored. Thus matrix is updated in real time by calculating $M_x x(o)$ where x(0) represents the current states provided by the state estimator module 316. $S_x x(0)$ can be performed once instead of twice together with a series of multiplications by zero.

Regarding the $M_{u1}$ matrix, $$M_{u1} = \begin{pmatrix} -S_{u1} \\ S_{u1} \\ -1_p \\ 1_p \\ 0 \\ 0 \end{pmatrix}.$$

Similar to the $M_x$ matrix, only $S_{u1}$ can be stored for $M_{u1}$. When calculating $M_{u1}u(-1)$, where u(-1) represents the target values of the previous control loop, $S_{u1}(-1)$ can be computed only once as $$1_p u(-1) = \begin{pmatrix} u(-1) \\ \vdots \\ u(-1) \end{pmatrix}.$$

Regarding the $M_v$ matrix, $$M_v = \begin{pmatrix} -H_v \\ H_v \\ 0 \\ 0 \\ 0 \\ 0 \end{pmatrix}.$$

For this, only $$H_{v1} = \begin{pmatrix} G_0 \\ G_1 \\ \vdots \\ G_{p-1} \end{pmatrix}$$

can be stored. Letting $$V = \begin{pmatrix} v(0) \\ v(1) \\ \vdots \\ v(p-1) \end{pmatrix}$$

yields $$H_v V =$$

$$\begin{pmatrix} G_0 & 0 & \ldots & 0 \\ G_1 & G_0 & \ldots & 0 \\ \vdots & \vdots & \vdots & 0 \\ G_{p-1} & G_{p-2} & \ldots & G_0 \end{pmatrix} \begin{pmatrix} v(0) \\ v(1) \\ \vdots \\ v(p-1) \end{pmatrix} = \begin{pmatrix} G_0 v(0) \\ G_1 v(0) + G_0 v(1) \\ \vdots \\ G_{p-1} v(0) + \ldots + G_0 v(p-1) \end{pmatrix}.$$

Figure 5:
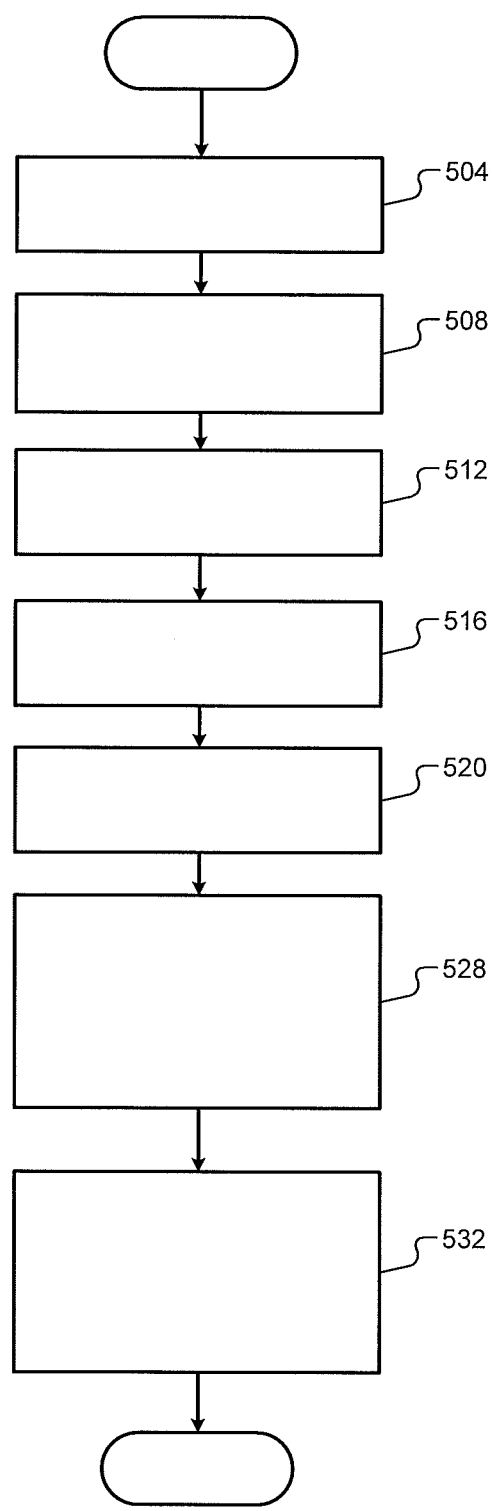
FIG. 5 includes a flowchart depicting an example method of controlling a throttle valve, intake and exhaust valve phasing, a wastegate, and an exhaust gas recirculation (EGR) valve using model predictive control.

Referring now to FIG. 5, a flowchart depicting an example method of estimating operating parameters and controlling the throttle valve 112, the intake cam phaser 148, the exhaust cam phaser 150, the wastegate 162 (and therefore the turbocharger), and the EGR valve 170 using MPC (model predictive control) is presented. Control may begin with 504 where the torque requesting module 224 determines the air torque request 265 based on the adjusted predicted and immediate torque requests 263 and 264. At 508, the torque conversion module 304 may convert the air torque request 265 into the base air torque request 308 or into another suitable type of torque for use by the MPC module 312. At 512, the state estimator module 316 determines the states of the engine 102 for the current control loop, as described above. The state estimator module 316 may determine the states, for example, using a Kalman filter.

At 516, the optimization module 320 solves the optimization problem to determine the optimal pair (x*, λ*) for determining the target values 266-270, as described above. The optimization module 320 determines the target values 266-270 for the current control loop based on the target values 266-270 for the last control loop and the delta values of x*, respectively, at 520. For example only, the optimization module 320 determines the target values 266-270 by summing the delta values of x* with the target values 266-270 for the last control loop, respectively.

At 528, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 428. The fourth conversion module may also convert the target intake and exhaust cam phaser angles 269 and 270 into the target intake and exhaust duty cycles to be applied to the intake and exhaust cam phasers 148 and 150, respectively.

At 532, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 532, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 5 is shown as ending after 432, FIG. 5 is illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. An engine control system for a vehicle, comprising: a torque requesting module that is configured to generate a first torque request for a spark ignition engine based on driver input; a torque conversion module that is configured to convert the first torque request into a second torque request; a model predictive control (MPC) module that is configured to perform multiple iterations to determine a current set of target values based on the second torque request, a model of the engine, a tableau matrix, and a basic solution matrix, wherein each of the iterations includes the MPC module: determining whether the basic solution matrix is: not in standard form including a non-basic pair of primal and dual variables; or in standard form including a basic pair of primal and dual variables; when the basic solution matrix is not in standard form, identifying a first column of the tableau matrix based on a first entry position of the primal variable of the non-basic pair; when the basic solution matrix is in standard form and one or more primal variables of the basic solution matrix are negative, identifying the first column of the tableau matrix based on a second entry position of a dual variable of the basic pair; and selectively updating the basic solution matrix based on the first column of the tableau matrix; and an actuator module that is configured to control an engine actuator based on a first one of the current set of target values.

2. The engine control system of claim 1 wherein the MPC module is configured to determine the current set of target values based on entries of the basic solution matrix when the basic solution matrix is in standard form and all primal variables of the basic solution matrix are positive.

3. The engine control system of claim 2 wherein the MPC module is configured to determine the current set of target values based on entries of the basic solution matrix when the basic solution matrix is in standard form and all primal variables of the basic solution matrix are positive.

4. The engine control system of claim 3 wherein, when the basic solution matrix is in standard form and all primal variables of the basic solution matrix are positive, the MPC module: is configured to determine changes for the target values, respectively, based on entries of the basic solution matrix; and determine the current set of target values by summing the changes with a last set of target values, respectively.

5. The engine control system of claim 1 wherein, when the basic solution matrix is in standard form, the MPC module is configured to identify the first column of the tableau matrix based on a third entry position of the dual variable that is paired with a most negative primal variable.

6. The engine control system of claim 1 wherein the MPC module is configured to selectively update the basic solution matrix based on a ratio of: one of a dual variable of the basic solution matrix and a primal variable of the basic solution matrix; to a corresponding entry of the tableau matrix.

7. The engine control system of claim 1 wherein, for each dual variable and a primal variable of the basic solution matrix, the MPC module is configured to determine a ratio between that entry of the basic solution matrix and the corresponding entry of the tableau matrix, identify a smallest positive one of the ratios, and selectively update the basic solution matrix based on the entry position of the corresponding entry of the tableau matrix.

8. The engine control system of claim 7 wherein the MPC module is configured to indicate that a failure has occurred when none of the ratios are positive.

9. The engine control system of claim 1 wherein the MPC module does not perform matrix multiplication of entries of matrices for predetermined weighting values that are equal to zero.

10. The engine control system of claim 1 further comprising: a boost actuator module that is configured to control opening of a wastegate of a turbocharger based on a second one of the current set of target values; an exhaust gas recirculation (EGR) actuator module that is configured to control opening of an EGR valve based on a third one of the current set of target values; and a phaser actuator module that is configured to control intake and exhaust valve phasing based on fourth and fifth ones of the current set of target values, respectively, wherein the actuator module is configured to control opening of a throttle valve based on the one of the current set of target values.

11. An engine control method for a vehicle, comprising:
generating a first torque request for a spark ignition engine based on driver input;
converting the first torque request into a second torque request;
using a model predictive control (MPC) module that performs multiple iterations to determine a current set of target values based on the second torque request, a model of the engine, a tableau matrix, and a basic solution matrix, each of the iterations including:
determining whether the basic solution matrix is: not in standard form including a non-basic pair of primal and dual variables; or in standard form including a basic pair of primal and dual variables;
when the basic solution matrix is not in standard form, identifying a first column of the tableau matrix based on a first entry position of the primal variable of the non-basic pair;
when the basic solution matrix is in standard form and one or more primal variables of the basic solution matrix are negative, identifying the first column of the tableau matrix based on a second entry position of a dual variable of the basic pair; and
selectively updating the basic solution matrix based on the first column of the tableau matrix; and
controlling an engine actuator based on a first one of the current set of target values.

12. The engine control method of claim 11 further comprising determining the current set of target values based on entries of the basic solution matrix when the basic solution matrix is in standard form and all primal variables of the basic solution matrix are positive.

13. The engine control method of claim 12 further comprising determining the current set of target values based on entries of the basic solution matrix when the basic solution matrix is in standard form and all primal variables of the basic solution matrix are positive.

14. The engine control method of claim 13 further comprising, when the basic solution matrix is in standard form and all primal variables of the basic solution matrix are positive:
determining changes for the target values, respectively, based on entries of the basic solution matrix; and
determining the current set of target values by summing the changes with a last set of target values, respectively.

15. The engine control method of claim 11 further comprising, when the basic solution matrix is in standard form, identifying the first column of the tableau matrix based on a third entry position of the dual variable that is paired with a most negative primal variable.

16. The engine control method of claim 11 further comprising selectively updating the basic solution matrix based on a ratio of:
one of a dual variable of the basic solution matrix and a primal variable of the basic solution matrix; to
a corresponding entry of the tableau matrix.

17. The engine control method of claim 11 further comprising, for each dual variable and a primal variable of the basic solution matrix:
determining a ratio between that entry of the basic solution matrix and the corresponding entry of the tableau matrix;
identifying a smallest positive one of the ratios; and
selectively updating the basic solution matrix based on the entry position of the corresponding entry of the tableau matrix.

18. The engine control method of claim 17 further comprising indicating that a failure has occurred when none of the ratios are positive.

19. The engine control method of claim 11 further comprising not performing matrix multiplication of entries of matrices for predetermined weighting values that are equal to zero.

20. The engine control method of claim 11 further comprising:
- controlling opening of a wastegate of a turbocharger based on a second one of the current set of target values;
- controlling an exhaust gas recirculation (EGR) actuator valve based on a third one of the current set of target values; and
- controlling intake and exhaust valve phasing based on fourth and fifth ones of the current set of target values, respectively; and
- controlling opening of a throttle valve based on the one of the current set of target values.

* * * * *